(12) United States Patent
Fingerer et al.

(10) Patent No.: US 8,954,875 B2
(45) Date of Patent: Feb. 10, 2015

(54) FLORAL ARRANGEMENT CREATION SYSTEM, METHOD AND COMPUTER PROGRAM PRODUCT

(75) Inventors: Moses E. Fingerer, Brooklyn, NY (US); Isaac C. Fingerer, Brooklyn, NY (US)

(73) Assignee: Exciting Unlimited LLC, Brooklyn, NY (US)

( * ) Notice: Subject to any disclaimer, the term of this patent is extended or adjusted under 35 U.S.C. 154(b) by 804 days.

(21) Appl. No.: 12/756,840

(22) Filed: Apr. 8, 2010

(65) Prior Publication Data

US 2011/0252348 A1 Oct. 13, 2011

(51) Int. Cl.
 *G06F 3/048* (2013.01)
 *G06Q 30/06* (2012.01)

(52) U.S. Cl.
 CPC .................. *G06Q 30/0603* (2013.01)
 USPC ......................................... 715/769; 345/418

(58) Field of Classification Search
 USPC ........................................ 715/769; 345/418
 See application file for complete search history.

(56) References Cited

U.S. PATENT DOCUMENTS

| 4,606,950 | A | | 8/1986 | Corbet |
| 5,255,386 | A | * | 10/1993 | Prager ..................................... 1/1 |
| 7,337,413 | B1 | * | 2/2008 | Reesh et al. ................... 715/700 |
| 8,212,805 | B1 | * | 7/2012 | Banschick et al. ............. 345/418 |
| 2002/0068262 | A1 | | 6/2002 | Robinson |
| 2003/0061285 | A1 | * | 3/2003 | Usui et al. ...................... 709/205 |
| 2008/0274805 | A1 | * | 11/2008 | Ganz et al. ........................ 463/29 |
| 2009/0063302 | A1 | * | 3/2009 | Greenwald ....................... 705/27 |
| 2009/0254832 | A1 | * | 10/2009 | Li et al. ........................... 715/734 |

OTHER PUBLICATIONS

Saruwatari et al., Ikebana Support System Reflecting Kansei with Interactive Evolutionary Computation, 2005, ICEC 2005, pp. 456-467.*
"Build-A-Bouquet by Power Design" [online][retrieved Apr. 19, 2010]. Retrieved from the Internet <URL: http://www.powerdesign.com/images/interactive/build.html>.
"Salvy the Florist—DesignABouquet" [online][retrieved Apr. 16, 2010]. Retrieved from the Internet <URL: http://www.salvytheflorist.com/cgi-bin/configurator.cgi?step=0>.
"Russian Flora—Build Your Own Bouquet" [online][retrieved Apr. 16, 2010]. Retrieved from the Internet <URL: http://www.russianflora.com/cgi-bin/store/index.cgi?pid=10004>.
"Russian Flora—Custom Bouquet Builder" [online][retrieved on Apr. 16, 2010]. Retrieved from the Internet <URL: http://www.russianflora.com/bouquetbuilder/bqlaunch.php>.
"Central Park—Create your own Virtual Bouquet—flowers from The Conservatory Garden" [online][retrieved Apr. 16, 2010]. Retrieved from the Internet <URL: http://www.centralpark.com/virtual-bouquet/create>.

(Continued)

*Primary Examiner* — Stephen Alvesteffer
*Assistant Examiner* — William Trapanese

(57) ABSTRACT

A method for providing a floral arrangement including providing, by using at least one processor, a plurality of flower choices to a user, receiving, by using at least one processor, from the user at least two flower inputs from the plurality of flower choices, where each of the at least two flower inputs comprise a flower type, each flower type comprising at least one of: a line flower, a focal flower, or a filler flower, generating, by using at least one processor, a floral arrangement based on the flower types of the flower inputs, and providing, by using at least one processor, the floral arrangement to the user.

20 Claims, 11 Drawing Sheets

(56) References Cited

OTHER PUBLICATIONS

"Links 2 Love—Design and Build Your Own Bridal Bouquets for Turquoise Bridesmaids" [online][retrieved Apr. 19, 2010]. Retrieved from the Internet <URL: http://www.links2love.com/weddings/make_bouquet_wedding_turquoise_colors.htm>.

"Links 2 Love—Wedding Flowers: Design and Build Your Own Bridal Bouquet with Magnetic Flowers" [online][retrieved Apr. 16, 2010]. Retrieved from the Internet <URL: http://www.links2love.com/weddings/build_your_bouquet.htm>.

"Links2Love—Blue Bridesmaids Wedding Flowers: Design and Build Your Own Bridal Bouquet" [online][retrieved Apr. 16, 2010]. Retrieved from the Internet <URL: http://www.links2love.com/weddings/make_bouquet_wedding_blue_colors.htm>.

"eHow—How to Make a Bouquet for the Bride" [online][retrieved Apr. 19, 2010]. Retrieved from the Internet <URL: http://www.ehow.com/how_17553_make-bouquet-bride.html>.

* cited by examiner

FLORAL ARRANGEMENT CREATION SYSTEM, METHOD AND COMPUTER PROGRAM PRODUCT

BACKGROUND OF THE INVENTION

1. Field of the Invention

This invention pertains generally to floral arrangements and more specifically to systems and methods of creation of floral arrangements.

2. Related Art

Many websites currently offer users the opportunity to purchase pre-made floral arrangements, centerpieces and bouquets for gift giving and special occasions. However, these websites do not offer the ability for a novice to customize a bouquet, arrangement or centerpiece.

Conventional methods for users to create floral arrangements offer only a very basic way of arranging flowers, with very limited ability, or no ability whatsoever, to include flowers in the arrangement based on flower types.

What is needed is a method to enable a user to create a floral arrangement based on flower types.

SUMMARY OF THE INVENTION

In an illustrative embodiment of the present invention, a method, machine-accessible medium, and apparatus are disclosed. According to one embodiment, a method for providing a floral arrangement may include providing, by using at least one processor, a plurality of flower choices to a user, receiving, by using the at least one processor, from the user at least two flower inputs from the plurality of flower choices, where each of the at least two flower inputs include a flower type, each flower type including at least one of: a line flower, a focal flower, or a filler flower, generating, by using the at least one processor, a floral arrangement based on the flower types of the flower inputs, and providing, by using the at least one processor, the floral arrangement to the user.

According to another embodiment, a machine-accessible medium containing instructions may be provided. The instructions may, when executed by at least one processor, cause the at least one processor to perform a method for providing a floral arrangement including: providing, by using the at least one processor, a plurality of flower choices to a user, receiving, by using the at least one processor, from the user at least two flower inputs from the plurality of flower choices, where each of the at least two flower inputs include a flower type, each flower type including at least one of: a line flower, a focal flower, or a filler flower, generating, by using the at least one processor, a floral arrangement based on the flower types of the flower inputs, and providing, by using the at least one processor, the floral arrangement to the user.

According to another embodiment, an apparatus for providing a floral arrangement may be provided. The apparatus may include: means for providing a plurality of flower choices to a user, means for receiving from the user at least two flower inputs from the plurality of flower choices, where each of the at least two flower inputs include a flower type, each flower type including at least one of: a line flower, a focal flower, or a filler flower, means for generating a floral arrangement based on the flower types of the flower inputs, and means for providing the floral arrangement to the user.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS OF THE PRESENT INVENTION

Exemplary embodiments of the invention are described in detail below. While specific exemplary embodiments are discussed, it should be understood that this is done for illustration purposes only. In describing and illustrating the exemplary embodiments, specific terminology is employed for the sake of clarity. However, the following is not intended to be limited to the specific terminology so selected. A person skilled in the relevant art will recognize that other components and configurations may be used without parting from the spirit and scope of the application. It is to be understood that each specific element includes all technical equivalents that operate in a similar manner to accomplish a similar purpose. The examples and embodiments described herein are non-limiting examples.

Figure 1:
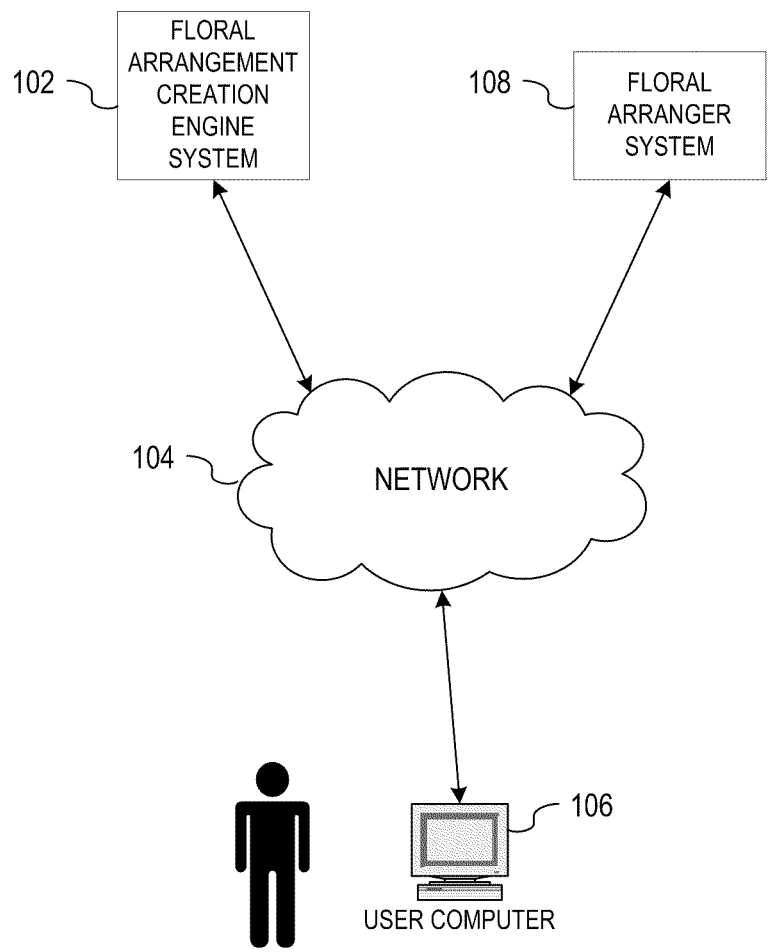
FIG. 1 illustrates an exemplary system diagram for providing a floral arrangement creation engine in accordance with an exemplary embodiment of the present invention.

FIG. 1 illustrates a system diagram 100 for providing a floral arrangement creation engine system 102 in accordance with an exemplary embodiment of the present invention. According to an exemplary embodiment, the system may include a floral arrangement creation engine system 102. In an exemplary embodiment, the floral arrangement creation engine system 102 may include computer system running a software application program for floral arrangement creation. According to another exemplary embodiment, the floral arrangement creation engine system 102 may include software executing on a computer system, such as, e.g., but not limited to, a server for floral arrangement creation.

In an exemplary embodiment, the floral arrangement creation engine system 102 may be coupled to a user computer 106 via a network 104. According to an exemplary embodiment, the network 104 may provide communication between the floral arrangement creation engine system 102 and the user computer 106. In an exemplary embodiment, the network 104 may be the Internet. According to an exemplary embodiment, the user computer 106 may be an iPhone™ or iPod™ According to an exemplary embodiment, the floral arrangement creation engine system 102 may function as a server where a user may use a user computer 106 to access the floral arrangement creation engine system 102. In another exemplary embodiment, the user computer 106 and floral arrangement creation engine system 102 may be the same device. According to an exemplary embodiment, a user may download or install software on the user computer 106 to perform the functionality of the floral arrangement creation engine system 102.

According to an exemplary embodiment, the floral arrangement creation engine system 102 may also be coupled to a floral arranger system 108. The floral arranger system 108 may be a server or a computer of the floral arranger. In an exemplary embodiment, the network 104 may provide communication between the floral arrangement creation engine system 102 and the floral arranger system 108. According to an exemplary embodiment, the floral arrangement creation engine system 102 may run on the user computer 106.

According to an exemplary embodiment, a user may use the user computer 106 to interact with the floral arrangement creation engine system 102. In an exemplary embodiment, the user may create and purchase a floral arrangement using the floral arrangement creation engine system 102. According to an exemplary embodiment, the floral arrangement creation engine system 102 may communicate the user's floral arrangement to the floral arranger system 108. In an exemplary embodiment, a florist may create the actual floral arrangement from actual flowers using the information received by the floral arranger system 108. According to an exemplary embodiment, the created actual floral arrangement may then be provided to the user.

According to an exemplary embodiment, the floral arrangement creation engine system 102 may be used for transactional e-commerce. Users may create and purchase floral arrangements using the floral arrangement creation engine system 102. In another exemplary embodiment, the floral arrangement creation engine system 102 may be used for non-transactional purposes. According to an exemplary embodiment, the floral arrangement creation engine system 102 may allow users to create virtual floral arrangements and send the virtual floral arrangement to friends. In an exemplary embodiment, advertisements may be displayed during at least one of the creation process or viewing process. According to another exemplary embodiment, the floral arrangement creation engine system 102 may be used in social networking. In an exemplary embodiment, the users may compete in creating floral arrangements or share floral arrangements through a social networking platform, such as, e.g., but not limited to Facebook and Twitter, etc.

Figure 2:
FIG. 2 illustrates a diagram of illustrative types of flower types in a floral arrangement in accordance with an exemplary embodiment of the present invention.

FIG. 2 illustrates a diagram of the types of flower types in a floral arrangement 200 in accordance with an exemplary embodiment of the present invention. In an exemplary embodiment, a floral arrangement 200 may include at least one of: one or more line flowers 202, one or more focal flowers 204, one or more filler flowers 206, and one or more greenery 208. According to an exemplary embodiment, a line flower 202, a focal flower 204 and a filler flower 206 may be different types of flowers.

In an exemplary embodiment, line flowers 202 may be flowers that define the shape of an arrangement 200 and give height and shape to a floral arrangement 200. According to an exemplary embodiment, line flowers may be placed first in the flower container. Line flowers may be tall flowers like cattails, delphiniums, snapdragons, gladiola, calla lilies, and long stem roses.

According to an exemplary embodiment, focal flowers 204 may be the center of attention of a flower arrangement 200. Focal flowers 204 may bring interest and impact to a design and be the first flowers to draw the eye. In an exemplary embodiment, focal flowers 204 may be big flowers on single stems. Focal flowers 204 may be round in shape. Large or showy blooms, such as, e.g., but not limited to, hydrangeas, lilies, and peonies, may serve as focal flowers. An odd number of focal flowers may create a more natural look.

In an exemplary embodiment, focal flowers 204 may be single stem compact flowers that command the attention of the viewer. Focal flowers 204 may be placed close to the center of the arrangement slightly above and drooping below the edge. Focal flowers 204 may add stability to a design. Other examples of focal flowers 204 may include, such as, e.g., but not limited to, roses, magnolias, peonies, tulips, Gerbera, sunflowers, daisies and daffodils, Anemone, Anthurium, Bird of Paradise, Celosia, Lilies (Asiatic and Oriental), Orchids-Cymbidium, Paeonia, and Protea, etc.

According to an exemplary embodiment, filler flowers 206 may be used to fill up empty spaces in an arrangement 200. Filler flowers 206 may be inserted last, after focal flowers 204 and line flowers 202 are in place. Filler flowers 206 may add shape and fullness to an arrangement 200 and fill in spaces between the line 202 and focal flowers 204. Filler flowers 206 may make an arrangement look fuller. Filler flowers 206 may typically have several smaller blooms on each stem. Examples of filler flowers may include, such as, e.g., but not limited to, daisies, miniature carnations, statise, baby's breath (chrysanthemums), daffodils, irises, leptospermum, wax flowers, or solidago.

In an exemplary embodiment, greenery 208 may serve as the foundation of most arrangements. Greenery 208 may be used to cover a container or as a vase filler to hold flowers in place. Types of greenery may include different shades and textures of greens, such as, e.g., but not limited to, from soft ferns to long grasses like bear grass.

Figure 3:
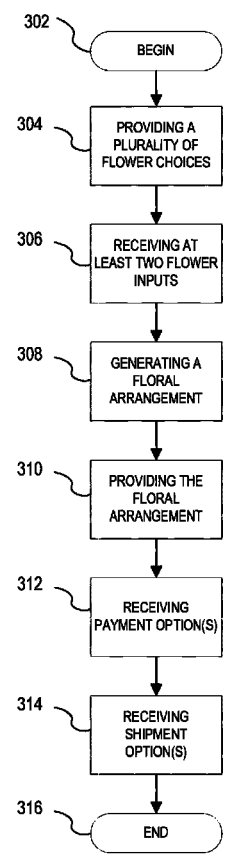
FIG. 3 illustrates an exemplary flowchart of exemplary steps of a floral arrangement creation engine method in accordance with an exemplary embodiment of the present invention.

FIG. 3 illustrates a flowchart 300 of steps of a floral arrangement creation engine system 102 in accordance with an exemplary embodiment of the present invention. In an exemplary embodiment, flowchart 300 may begin with 302 and immediately continue with 304.

According to an exemplary embodiment, in 304 the floral arrangement creation engine system 102 may provide a plurality of flower choices. In an exemplary embodiment, the floral arrangement creation engine system 102 may provide a plurality of flower choices to a user. In an exemplary embodiment, the floral arrangement creation engine system 102 may present a graphical user interface to a user through the user computer 106. According to an exemplary embodiment, through the graphical user interface, the floral arrangement creation engine system 102 may provide a plurality of flower choices to a user. An exemplary embodiment of a graphical interface is further discussed below in reference to FIGS. 6-11.

From 304, flowchart 300 may continue with 306. In 306, the floral arrangement creation engine system 102 may receive a flower input. According to an exemplary embodiment, the flower arrangement creation engine system 102 may receive a flower input of a user from the user computer 106. In an exemplary embodiment, a flower input may include, such as, e.g., but not limited to, a selection of a flower to include in a floral arrangement 200, a modification of an existing flower in a flower arrangement, a position to place a flower in an arrangement, and an orientation for a flower in an arrangement.

From 306, flowchart 300 may continue with 308. In 308, the floral arrangement creation engine system 102 may generate a floral arrangement 200. According to an exemplary embodiment, the floral arrangement creation engine system 102 may generate the floral arrangement 200 based on the flower input received in 306. In an exemplary embodiment, the floral arrangement creation engine system 102 may generate a floral arrangement 200 based on the flower type of the flower input. According to an exemplary embodiment, the floral arrangement creation engine system 102 may determine the flower type of the flower input based on data identifying the flower type associated with the flower input.

In an exemplary embodiment, the floral arrangement creation engine system 102 may determine at least one of a number or position of flowers to include in an arrangement based on the flower type of a flower input. According to an exemplary embodiment, if the floral arrangement creation engine system 102 receives a flower input of a long-stem rose, the floral arrangement creation engine system 102 may determine the flower input corresponds to the flower type of line flower. In an exemplary embodiment, the floral arrangement creation engine system 102 may pre-determine the number and position of flowers of a particular type in a floral arrangement 200. According to an embodiment, the pre-determinations may be at least one of pre-determined by a user, pre-determined according to templates, or pre-determined according to rules. In an exemplary embodiment, the floral arrangement creation engine system 102 may generate a floral arrangement 200 including the flower input of long-stem roses in the number and positions corresponding to line flowers in a floral arrangement 200. Generating a floral arrangement 200 based on a template is further described below in reference to FIG. 4.

According to another exemplary embodiment, generating the floral arrangement 200 may include generating a floral suggestion for a user based on the flower type of the flower input. In an exemplary embodiment, a floral suggestion may include, such as, e.g., but not limited to, a position for the flower input, an orientation for the flower input, a color for the flower input, a size for the flower input, a type for the flower input, or an error suggestion. According to an exemplary embodiment, floral suggestions may provide suggestions to improve a floral arrangement 200 based on one or more flower inputs from a user. In an exemplary embodiment, the floral arrangement creation engine system 102 may suggest modifications to existing flowers in a floral arrangement 200. According to an exemplary embodiment, the floral arrangement creation engine system 102 may determine the flower type associated with a location in the floral arrangement 200 and determine if a flower input in the location corresponds to the flower type associated with the location. In an exemplary embodiment, if the flower type of the flower input does not correspond to the associated flower type, the floral arrangement creation engine system 102 may give a floral suggestion to the user to use a different flower in the location. According to an exemplary embodiment, the floral arrangement creation engine system 102 may suggest types of flowers to add to a floral arrangement 200 based on the types of flowers already in a floral arrangement 200. Generating a floral arrangement 200 based on floral suggestions is further described below in reference to FIG. 5.

From 308, flowchart 300 may continue with 310. In 310, the floral arrangement creation engine system 102 may provide the flower arrangement to the user. According to an exemplary embodiment, the floral arrangement creation engine system 102 may provide the flower arrangement via displaying a representation of the generated floral arrangement 200 on a computer of the user.

From 310, flowchart 300 may continue with receiving payment options 312. In 312, the floral arrangement creation engine system 102 may receive payment option(s) from a user for purchasing an actual floral arrangement 200 based on the floral arrangement 200 generated based on the flower input from the user. In an exemplary embodiment, payment options may be forms of payments, such as, e.g., but not limited to, credit card, PayPal, gift certificate, or bank account, etc. According to an exemplary embodiment, the floral arrangement creation engine system 102 may present the user one or more of the above options of payment and the user may select one or more forms of payment using one or more of the options available from the floral arrangement creation engine system 102.

From 312, flowchart 300 may continue with 314. In 314, the floral arrangement creation engine system 102 may receive shipment option(s). According to an exemplary embodiment, the floral arrangement creation engine system 102 may receive shipment options from a user for shipment information in shipping a purchased floral arrangement 200. In an exemplary embodiment, shipment options may include, such as, e.g., but not limited to, destination address, shipment carrier, shipment service type, signature requirement, or shipping insurance, etc. According to an exemplary embodiment, the floral arrangement creation engine system 102 may present available shipment options to the user and floral arrangement creation engine system 102 may receive shipment options selected by the user.

From 314, flowchart 300 may continue with 316 and end.

Figure 4:
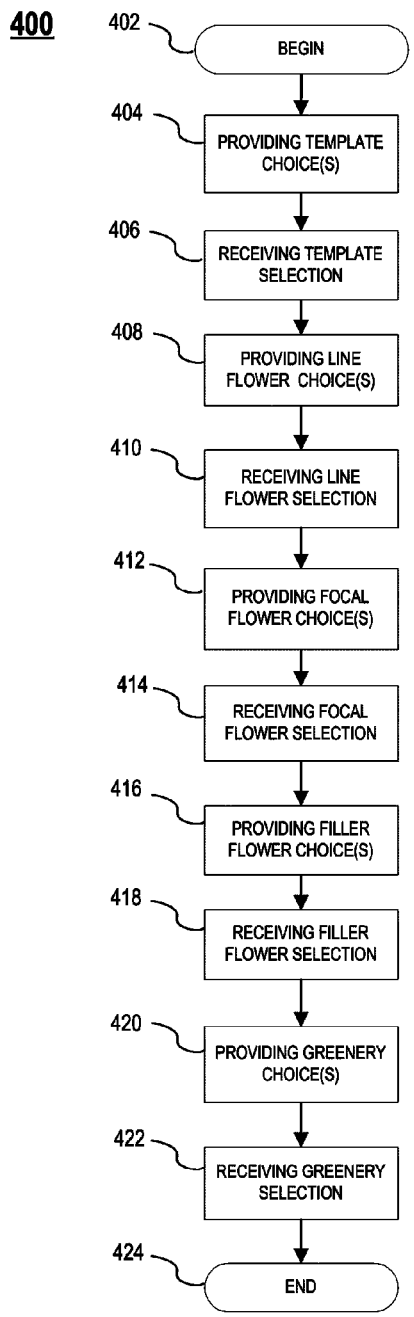
FIG. 4 illustrates an exemplary flowchart of creation of a floral arrangement based on a bouquet template in accordance with an exemplary embodiment of the present invention.

FIG. 4 illustrates a flowchart 400 of the creation of a floral arrangement 200 based on a bouquet template in accordance with an exemplary embodiment of the present invention. According to an exemplary embodiment, flowchart 400 may begin with 402 and immediately continue with 404. In 404, the floral arrangement creation engine system 102 may provide one or more template choices to a user. According to an exemplary embodiment, the floral arrangement creation engine system 102 may provide a plurality of bouquet template choices to a user.

According to an exemplary embodiment, each bouquet template selection may have information associated with the template identifying a number and location of each type of flower in the bouquet template.

In an exemplary embodiment, bouquet templates may include line arrangements, mass arrangements, line-mass arrangements, wedding arrangements, or theme arrangements. According to an exemplary embodiment, line arrangements may also be known as minimalist arrangements. Line arrangements may be relatively spare. Minimal arrangements may make use of space as a design element. Minimal arrangements may place an emphasis on just a few vertical flowers or branches. The effect created by minimal arrangements is often dramatic and modern in appearance. Tall flowers may be important to minimal arrangements, as tall flowers create a long, graceful line.

According to an exemplary embodiment, mass arrangements may also be known as traditional arrangements. In an exemplary embodiment, mass arrangements may include flowers that are displayed symmetrically, such as, e.g., but not limited to, a triangular, round, or oval shape. Mass arrangements may also include only one type of flower. The effect of mass arrangements may be classic with a very full appearance.

According to an exemplary embodiment, line-mass arrangements may be a combination of line and mass arrangements. Line-mass arrangements may use linear flowers to create a strong line along with larger focal flowers for a distinct mass. In an exemplary embodiment, either the line or the mass portion may be emphasized to create a shape with a defined focal point that blends well as one arrangement. Line-mass arrangements may often be asymmetrical.

According to an exemplary embodiment, examples of line-mass arrangements may include a zigzag design. In an exemplary embodiment, the zigzag design may be restless and quick as lightning. According to an exemplary embodiment, a small amount of plant material may be used to emphasize the focal area, where the line originates, and may extend along the line trailing off as it leads the eye toward the sharp angles.

In an exemplary embodiment, an asymmetrical triangle arrangement may be a line or line-mass design. The asymmetrical triangle arrangement may be either right or left handed, meaning the tallest line may either be right or left of the axis. According to an exemplary embodiment, some bare branches, a few flowers and some leaves may suffice to make a beautiful design.

In an exemplary embodiment, bouquet templates may also correspond to particular themes, such as, e.g., but not limited to, Valentine's Day, graduation, wedding, or an anniversary, etc.

According to an exemplary embodiment, when the bouquet templates are provided to the user, each template may appear as a rough sketch/outline of the template. In an exemplary embodiment, a user may choose a minimalist template because the user feels that the rough sketch/outline of the minimalist template suits best as it may have the least amount of flowers and may be the most contemporary looking design.

From 404, flowchart 400 may continue with 406. In 406, the floral arrangement creation engine system 102 may receive a template selection from the user selecting one of the templates presented in 404.

From 406, flowchart 400 may continue with 408. In 408, the floral arrangement creation engine system 102 may provide one or more line flower choices for a user. The line flower choices available may be based on the template received in 406.

From 408, flowchart 400 may continue with 410. In exemplary embodiment, a user may select a line flower to include in the floral arrangement 200 from the choices. According to an exemplary embodiment, a selection may include a drag-and-drop of a flower choice onto a depiction of the floral arrangement 200. In an exemplary embodiment, the floral arrangement creation engine system 102 may include one or more line flowers selected by the user in the arrangement based on the template selected. According to an exemplary embodiment, the floral arrangement creation engine system 102 may select the number of line flowers and position of the line flowers to include in the floral arrangement 200 based on the template selected.

From 410, flowchart 400 may continue with 412. In 412, the floral arrangement creation engine system 102 may process focal flower selection. According to an exemplary embodiment, the floral arrangement creation engine system 102 may provide one or more focal flower choices for a user. In an exemplary embodiment, the focal flower choices may be based on the template selected by the user in 406.

From 412, flowchart 400 may continue with 414. In 414, the floral arrangement creation engine system 102 may receive focal flower selections from the user. According to an exemplary embodiment, the floral arrangement creation engine system 102 may include one or more focal flowers selected by the user in the arrangement based on the template selected. According to an exemplary embodiment, the floral arrangement creation engine system 102 may select the number of focal flowers and position of the focal flowers to include in the floral arrangement 200 based on the template selected.

From 414, flowchart 400 may continue with 416. In 416, the floral arrangement creation engine system 102 may provide one or more filler flower choices for a user. In an exemplary embodiment, the filler flower choices may be based on the template selected by the user in 406.

From 416, flowchart 400 may continue with 418. In 418, according to an exemplary embodiment, the floral arrangement creation engine system 102 may receive a filler flower selection from the user. According to an exemplary embodiment, the floral arrangement creation engine system 102 may include one or more filler flowers selected by the user in the arrangement based on the template selected. According to an exemplary embodiment, the floral arrangement creation engine system 102 may select the number of filler flowers and position of the filler flowers to include in the floral arrangement 200 based on the template selected.

From 418, flowchart 400 may continue with 420. In 420, the floral arrangement creation engine system 102 may provide one or more greenery choices for a user. In an exemplary embodiment, the greenery choices may be based on the template selected by the user in 406.

From 420, flowchart 400 may continue with 422. In 422, the floral arrangement creation engine system 102 may receive a greenery selection from the user. According to an exemplary embodiment, the floral arrangement creation engine system 102 may include one or more greenery selected by the user in the arrangement based on the template selected. According to an exemplary embodiment, the floral arrangement creation engine system 102 may select the number of greenery and position of the greenery to include in the floral arrangement 200 based on the template selected.

From 422, flowchart 400 may continue with 424 and end.

Figure 5:
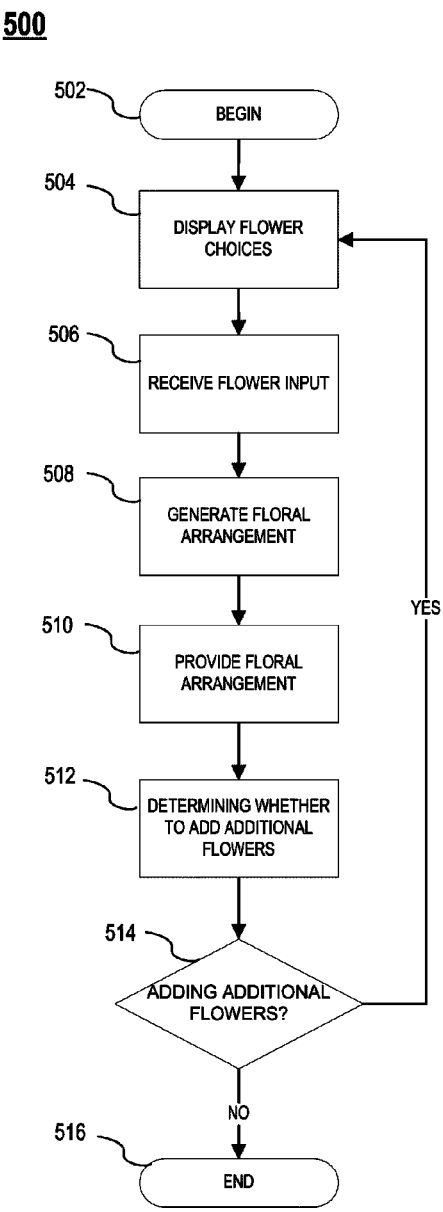
FIG. 5 illustrates an exemplary flowchart of creation of a floral arrangement not based on a bouquet template in accordance with an exemplary embodiment of the present invention.

FIG. 5 illustrates a flowchart 500 of the creation of a floral arrangement 200 not based on a bouquet template in accordance with an exemplary embodiment of the present invention. In an exemplary embodiment, flowchart 500 may permit a user to arbitrarily create a floral arrangement 200. Flowchart 500 may begin with 502 and immediately continue with 504. According to an exemplary embodiment, in 504 the floral arrangement creation engine system 102 may provide a plurality of flower choices for a user. In an exemplary embodiment, the floral arrangement creation engine system 102 may provide the user choices for all flowers available.

From 504, flowchart 500 may continue with 506. In 506, the floral arrangement creation engine system 102 may receive a flower input from the user. According to an exemplary embodiment, the flower input may designate a flower to include in a floral arrangement 200, and the position and orientation for the flower in the floral arrangement 200.

From 506, flowchart 500 may continue with 508. In 508, the floral arrangement creation engine system 102 may generate the floral arrangement 200. According to an exemplary embodiment, the floral arrangement creation engine system 102 may include a flower in the floral arrangement 200 as specified by the flower input. In an exemplary embodiment, the floral arrangement creation engine system 102 may generate a floral suggestion for the user to improve the floral arrangement 200. The floral suggestion may be at least any of the suggestions previously mentioned.

In an exemplary embodiment, floral suggestions may be generated when the floral arrangement creation engine system 102 determines a user is failing to follow bouquet building or florist design guidelines. According to an exemplary embodiment, floral suggestions may be alternate suggestions to help users appropriately design an arrangement. For example, to create proportion and the visual scaffolding for the arrangement, a designer may begin with inserting line flowers as they stand tall and create shape and proportion. Thus, according to an exemplary embodiment, if the user started designing a floral arrangement 200 with a focal flowers instead of line flower, the floral arrangement creation engine system 102 may determine the first flower is not a line flower, and generate a floral suggestion for the user to begin designing the floral arrangement 200 with a line flower.

According to an exemplary embodiment, if a user added line flowers to a location typically used for a focal flower, the floral arrangement creation engine system 102 may detect the use of the line flower in the focal flower location and generate an instructive error message for the user. In an exemplary embodiment, if a user added a line flower or focal flower to a location typically used by a filler flower, the floral arrangement creation engine system 102 may generate a floral suggestion accordingly. According to an exemplary embodiment, other suggestions may be generated when the user chooses a wrong mix between line and focal flowers, or a wrong combination of filler and line/focal flowers.

According to an exemplary embodiment, when the user receives a floral suggestion, they may also be presented with flowers choices from the appropriate type of flower.

From 508, flowchart 500 may continue with 510. In 510, the floral arrangement creation engine system 102 may provide the generated floral arrangement 200 to the user. According to an exemplary embodiment, the floral arrangement creation engine system 102 may provide the generated floral arrangement 200 to the user via transmitting data to the user computer for the user computer to display the floral arrangement 200 to the user.

From 510, flowchart 500 may continue with 512. In 512, the floral arrangement creation engine system 102 may determine whether to add additional flowers based on a user input. In an exemplary embodiment, the user may input that the user does not wish to add additional flowers or does wish to add additional flowers.

From 512, flowchart 500 may continue with 514. In 514, if the floral arrangement creation engine system 102 determines additional flowers will be added flowchart 500 may continue with 504. Alternatively, if the floral arrangement creation engine system 102 determines additional flowers will not be added, flowchart 500 may continue with 516. In 516, flowchart 500 may end.

Figure 6:
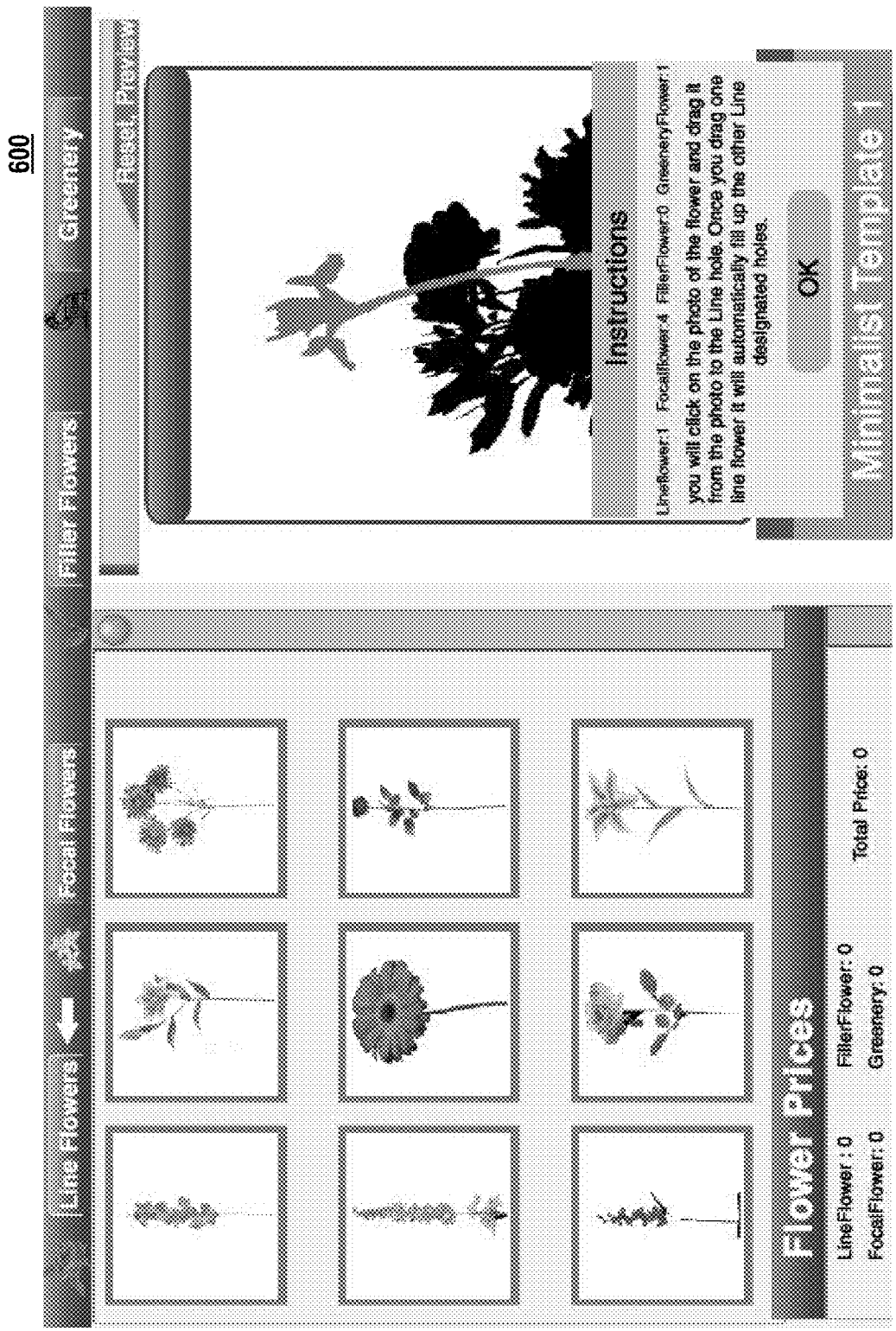
FIG. 6 illustrates an exemplary graphical user interface (GUI) for creation of a floral arrangement based on a bouquet template in accordance with an exemplary embodiment of the present invention.

FIG. 6 illustrates a graphical user interface (GUI) 600 for the creation of a floral arrangement 200 based on a bouquet template in accordance with an exemplary embodiment of the present invention. In an exemplary embodiment, the floral arrangement creation engine system 102 may interact with a user via a GUI 600 displayed on the user computer. According to an exemplary embodiment, the floral arrangement creation engine system 102 may provide the GUI 600 to the user computer and may update the GUI 600. In an exemplary embodiment, the GUI 600 may be a web interface. According to an exemplary embodiment, the GUI may include a flower choice area depicting one or more flower choices for a user to choose a flower to include in a floral arrangement 200. In an exemplary embodiment, each flower choice may correspond to an image of the flower in the flower choice area.

According to an exemplary embodiment, the GUI may also include a tab selection area in which users by select to view line flowers, focal flowers, filler flowers and greenery. In an exemplary embodiment, the tab selection may also include a tab for favorite flowers. According to an exemplary embodiment, when a user selects a tab in the tab selection area, the flower area may update to display flowers of the flower type corresponding to the tab.

In an exemplary embodiment, the GUI may also include a floral arrangement area. According to an exemplary embodiment, the floral arrangement area may display a floral arrangement 200 as designed by the user. In an exemplary embodiment, the user may drag-and-drop flower choices from the flower choice area to the floral arrangement area.

According to an exemplary embodiment, the flower choice area and floral arrangement area may permit the user to see each flower and the entire floral arrangement 200 in the precise manner in which the floral arrangement 200 will be created. In an exemplary embodiment, the floral arrangement area may offer the user a three-dimensional view of each flower and the ability to rotate the flower on its axis so the flower may be postured in the exact angle as in real-life. According to another exemplary embodiment, the GUI may display a three-dimensional panoramic view of the bouquet so that the user can see the entire breadth and scope of the bouquet.

In an exemplary embodiment, the first type of flower to include in the floral arrangement 200 may be a line flower. According to an exemplary embodiment, the GUI may begin with highlighting the line flowers in the tab selection area and displaying line flowers in the flower choice area. In an exemplary embodiment, the GUI may also display an outline of the template in the floral arrangement area. According to an exemplary embodiment, the GUI may display the location line flowers will appear in the floral arrangement area according to the template.

Figure 7:
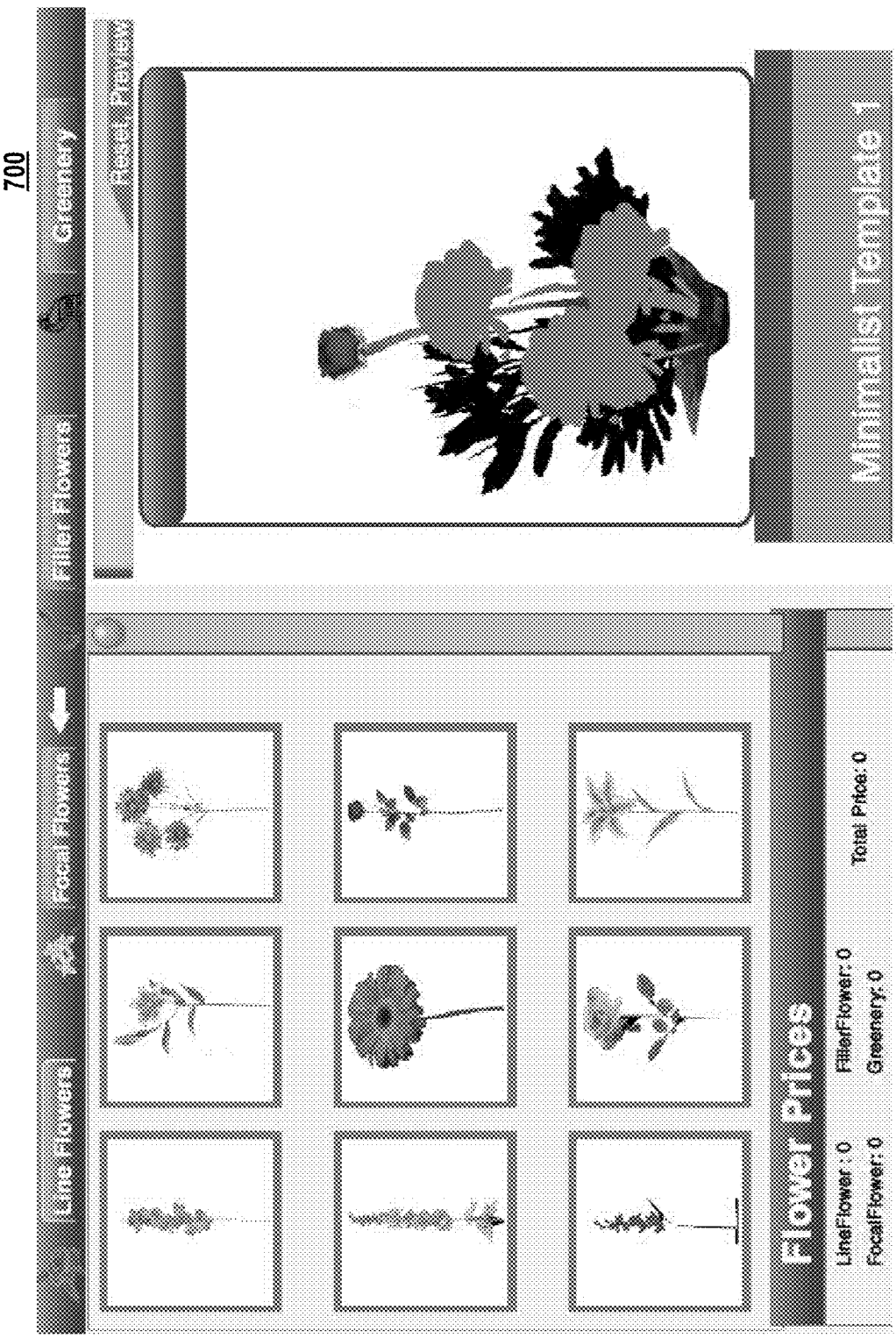
FIG. 7 illustrates an exemplary graphical user interface for receiving a selection of a focal flower in accordance with an exemplary embodiment of the present invention.

FIG. 7 illustrates a graphical user interface for the selection of a focal flower in accordance with an exemplary embodiment of the present invention. According to an exemplary embodiment, the GUI 600 may update after a user selects a line flower. In an exemplary embodiment, the GUI 600 may de-highlight the line flower tab and highlight the focal flower tab. According to an exemplary embodiment, the GUI 600 may display flower choices corresponding to focal flowers in the flower choice area. In an exemplary embodiment, the GUI

600 may update the floral arrangement area to display a graphical depiction of the line flower previously selected and may display the remaining areas of the floral arrangement 200 as an outline. According to an exemplary embodiment, the GUI may display the location the focal flowers will appear in the floral arrangement area according to the template.

Figure 8:
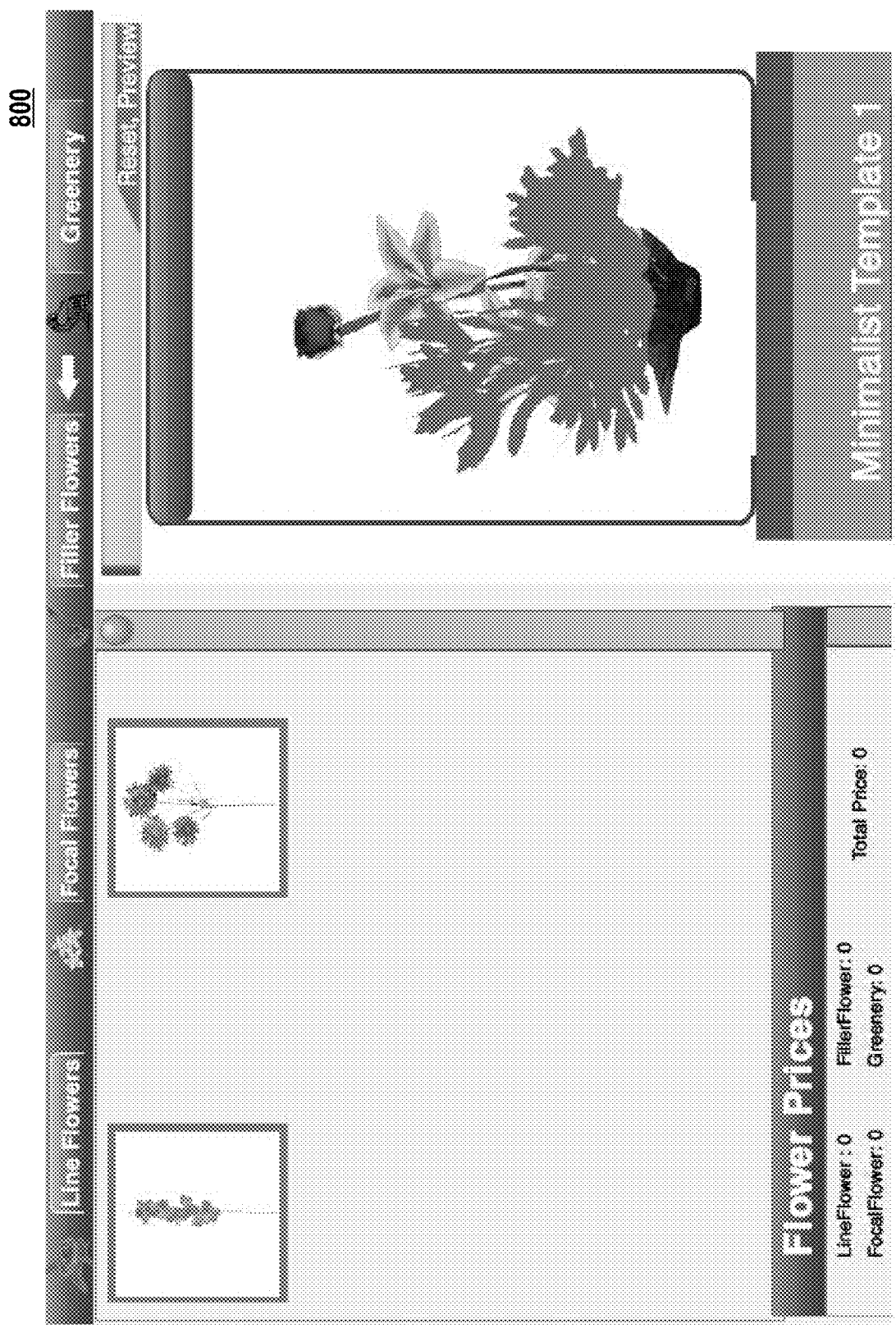
FIG. 8 illustrates an exemplary graphical user interface for receiving a selection of a filler flower in accordance with an exemplary embodiment of the present invention.

FIG. 8 illustrates a graphical user interface for the selection of a filler flower in accordance with an exemplary embodiment of the present invention. According to an exemplary embodiment, the GUI 600 may update after a user selects a focal flower. In an exemplary embodiment, the GUI 600 may de-highlight the focal flower tab and highlight the filler flower tab. According to an exemplary embodiment, the GUI 600 may display flower choices corresponding to filler flowers in the flower choice area. In an exemplary embodiment, the GUI 600 may update the floral arrangement area to display a graphical depiction of the focal flower and line flower previously selected and may display the remaining areas of the floral arrangement 200 as an outline. According to an exemplary embodiment, the GUI may display the location the filler flowers will appear in the floral arrangement area according to the template.

Figure 9:
FIG. 9 illustrates an exemplary graphical user interface for receiving a selection of greenery in accordance with an exemplary embodiment of the present invention.

FIG. 9 illustrates a graphical user interface for the selection of greenery in accordance with an exemplary embodiment of the present invention. According to an exemplary embodiment, the GUI 600 may update after a user selects a filler flower. In an exemplary embodiment, the GUI 600 may de-highlight the filler flower tab and highlight the greenery tab. According to an exemplary embodiment, the GUI 600 may display choices corresponding to greenery in the flower choice area. In an exemplary embodiment, the GUI 600 may update the floral arrangement area to display a graphical depiction of the filler flower, focal flower, and line flower previously selected and may display the remaining areas of the floral arrangement 200 as an outline. According to an exemplary embodiment, the GUI may display the location the greenery will appear in the floral arrangement area according to the template.

Figure 10:
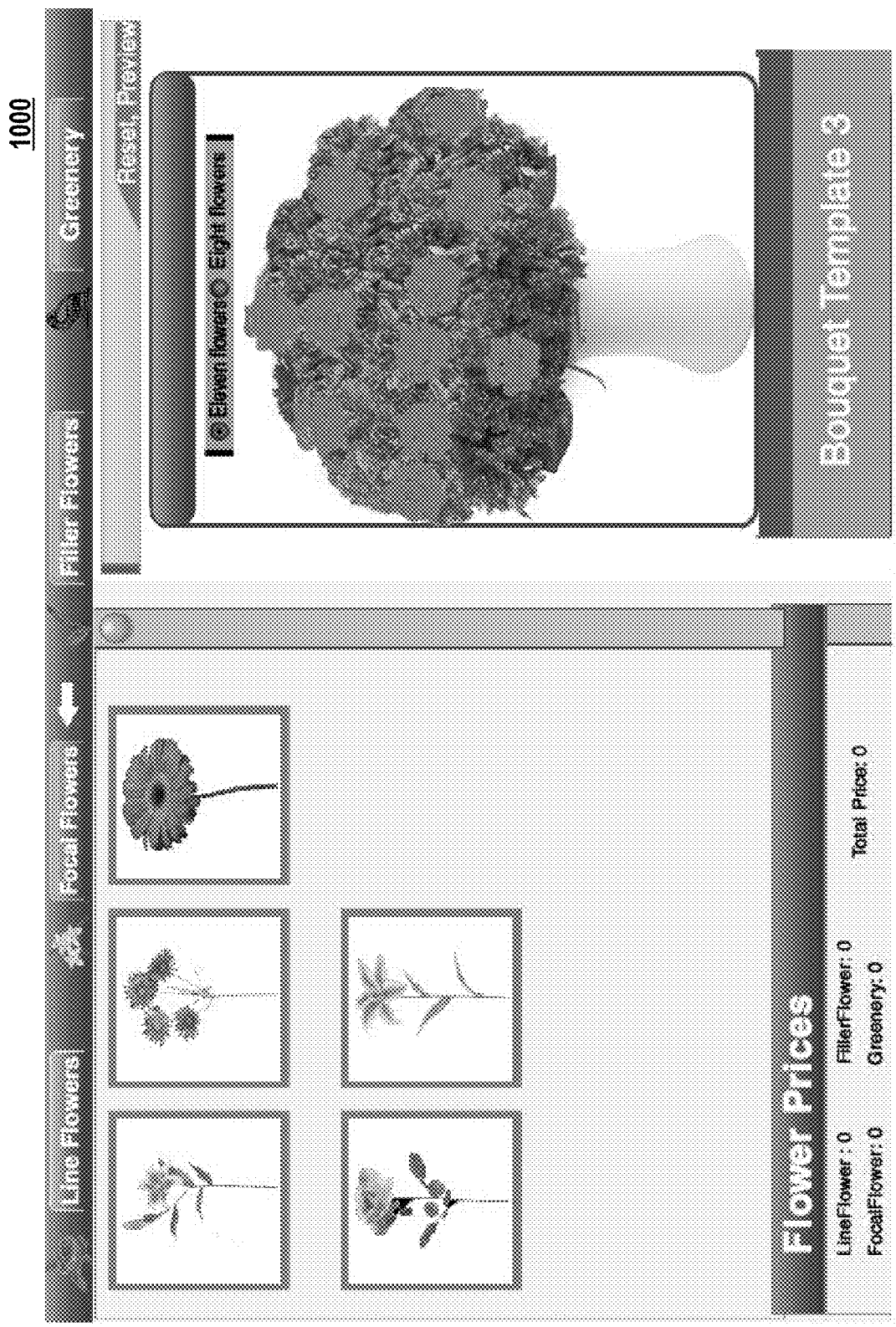
FIG. 10 illustrates an exemplary graphical user interface for receiving a selection of a number of flowers in a bouquet template in accordance with an exemplary embodiment of the present invention.

FIG. 10 illustrates a graphical user interface for the selection of the number of flowers in a bouquet template in accordance with an exemplary embodiment of the present invention. According to an exemplary embodiment, the GUI 600 may permit the user to select the number of flowers of one or more types to include a template arrangement. In an exemplary embodiment, the GUI may present the user the option of selecting eleven focal flowers or eight focal flowers to include in the arrangement. According to an exemplary embodiment, the floral arrangement area may depict an exemplary floral arrangement 200 with regions corresponding to the locations for the focal flowers. In an exemplary embodiment, the floral arrangement area may update based on the selected number of flowers to include in the floral arrangement 200. Accordingly to an exemplary embodiment, the floral arrangement area may also depict portions of the floral arrangement 200 that are selections for the user, such as, e.g., but not limited to, a vase, wrapping paper, or accessories, etc.

Figure 11:
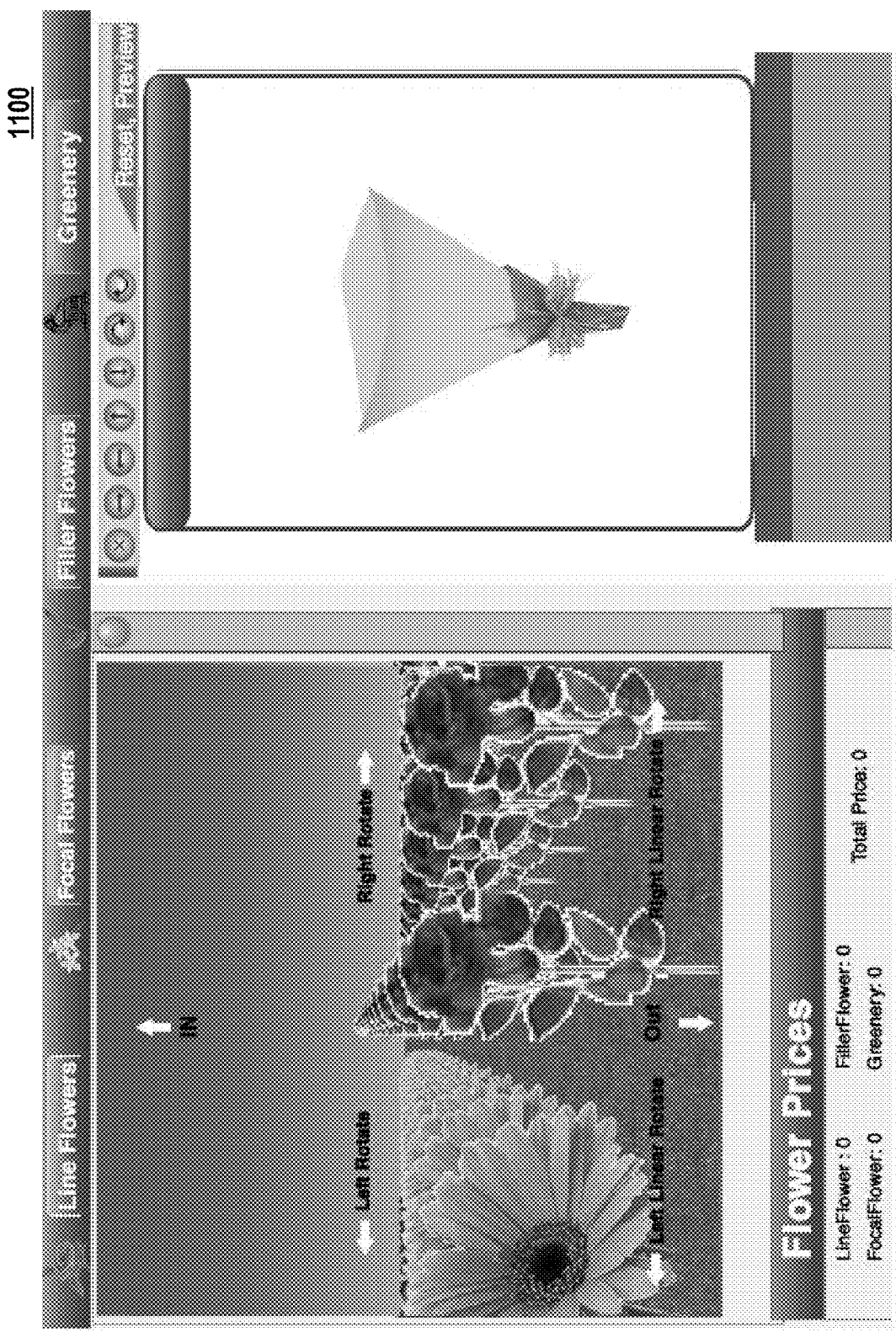
FIG. 11 illustrates an exemplary graphical user interface for creation of an exemplary floral arrangement not based on a bouquet template in accordance with an exemplary embodiment of the present invention.

FIG. 11 illustrates a graphical user interface for the creation of a floral arrangement 200 not based on a bouquet template in accordance with an exemplary embodiment of the present invention. According to an exemplary embodiment, a GUI 600 may include a flower choice area depicting a three-dimensional virtual reality with one or more flower choices represented by individual three-dimensional flowers. In an exemplary embodiment, the GUI may display a virtual reality with a virtual floral store in which users may walk through and select flowers to include in the floral arrangement 200.

According to an exemplary embodiment, the three-dimensional view may permit a change in view via a mouse or arrows. In an exemplary embodiment, the GUI may include middle level arrows for depth and rotation. According to an exemplary embodiment, the GUI may include a lower set of arrows for linear left and right movement.

According to an exemplary embodiment, the floral arrangement creation engine system 102 may also include options for a user to design a floral arrangement 200 including non-floral items, such as, e.g., but not limited to, stuffed animals, chocolate, or ribbons. In an exemplary embodiment, the GUI may also display the non-floral items in three-dimensions and the user may position the non-floral items with the floral arrangement 200.

In an exemplary embodiment, the GUI may also include an animated Bouquet Adviser which may offer regular recommendations to the user on style and presentation or may offer floral suggestions.

According to an exemplary embodiment, the floral arrangement creation engine system 102 may also include a dynamic color change function. In an exemplary embodiment, the user may automatically change any flower/bouquet to the color of the user's choice, without needing to search for other colored flowers.

According to an exemplary embodiment, the floral arrangement creation engine system 102 may offer the user a preview function in which the floral arrangement creation engine system 102 may modify or re-arrange flowers in the floral arrangement 200 to improve the floral arrangement 200. In an exemplary embodiment, the preview function may also offer suggestions to the users and display the user's choice of flowers in an alternate arrangement and in different colors. According to an exemplary embodiment, preview function may provide the user with vivid picture samples of how their selection may look different or more enhanced.

According to an exemplary embodiment, the floral arrangement creation engine system 102 may include a Bouquet Generator for users pressed on time, dissatisfied with their arrangement, or not wishing to avail themselves of either the templates or free-from options. In an exemplary embodiment, the Bouquet Generator may automatically generate a bouquet based on information the user inputs. According to an exemplary embodiment, the user input may include variables, such as, e.g., but not limited to, favorite flowers, number of flowers, budget, price range, preferred color, occasion, or theme, etc., and the Bouquet Generator may create a custom bouquet based on the variables presented to the floral arrangement creation engine system 102.

According to an exemplary embodiment, users may also employ the floral arrangement creation engine system 102 as a game device. In an exemplary embodiment, the user may be granted several chances to select the correct flowers to make an arrangement. According to an exemplary embodiment, the user may be presented with an incomplete floral arrangement 200 and must select a flower to include in the floral arrangement 200. In an exemplary embodiment, the user may be presented with flower choices and may attempt to create a floral arrangement 200 with as few errors as possible. According to an exemplary embodiment, in the event that the user makes the wrong selection, an error sound may play.

In an exemplary embodiment, the floral arrangement creation engine system 102 may allow for competitive, real-time play, in which users may compete on building the same bouquet. According to an exemplary embodiment, the user that places the flowers in correct symmetry and design may win the game and receive a discount on their purchase. In an exemplary embodiment, in competitive play the GUI may be divided and display an arrangement for the user in one division and an arrangement for the other user in another division.

According to an exemplary embodiment, the floral arrangement creation engine system 102 may permit users to view a real-time web cam of the floral designer implementing the user's design and building the user's actual bouquet. In an exemplary embodiment, the real-time web cam may enhance the user experience throughout the process and provide the user with an inside glimpse of how their arrangement is being prepared. According to an exemplary embodiment, the user may then be able to e-mail that real-time video to the recipient of the gift. In an exemplary embodiment, the floral arrangement creation engine system 102 may permit the user to download the real-time video or may permit the user to send a reference to the real-time video to be viewed using the floral arrangement creation engine system 102.

According to an exemplary embodiment, real-time may mean a live audio-video display with no lapse in time. In an exemplary embodiment, real time may be almost synonymous with "live", or concurrent.

According to an exemplary embodiment, the floral arrangement creation engine system 102 may employ social networking technology. In an exemplary embodiment, the floral arrangement creation engine system 102 may allow multiple users (a user group) to work on building the same bouquet or arrangement together. According to an exemplary embodiment, siblings that live miles apart, may wish to send an anniversary bouquet to their parents. The siblings may access the floral arrangement creation engine system 102 simultaneously and jointly work on their bouquet. In an exemplary embodiment, the floral arrangement creation engine system 102 may save a "work in progress" arrangement and allow the saved arrangement to be retrieved so users may be able to concurrently or separately access the floral arrangement creation engine system 102 to jointly work on a bouquet.

Figure 12:
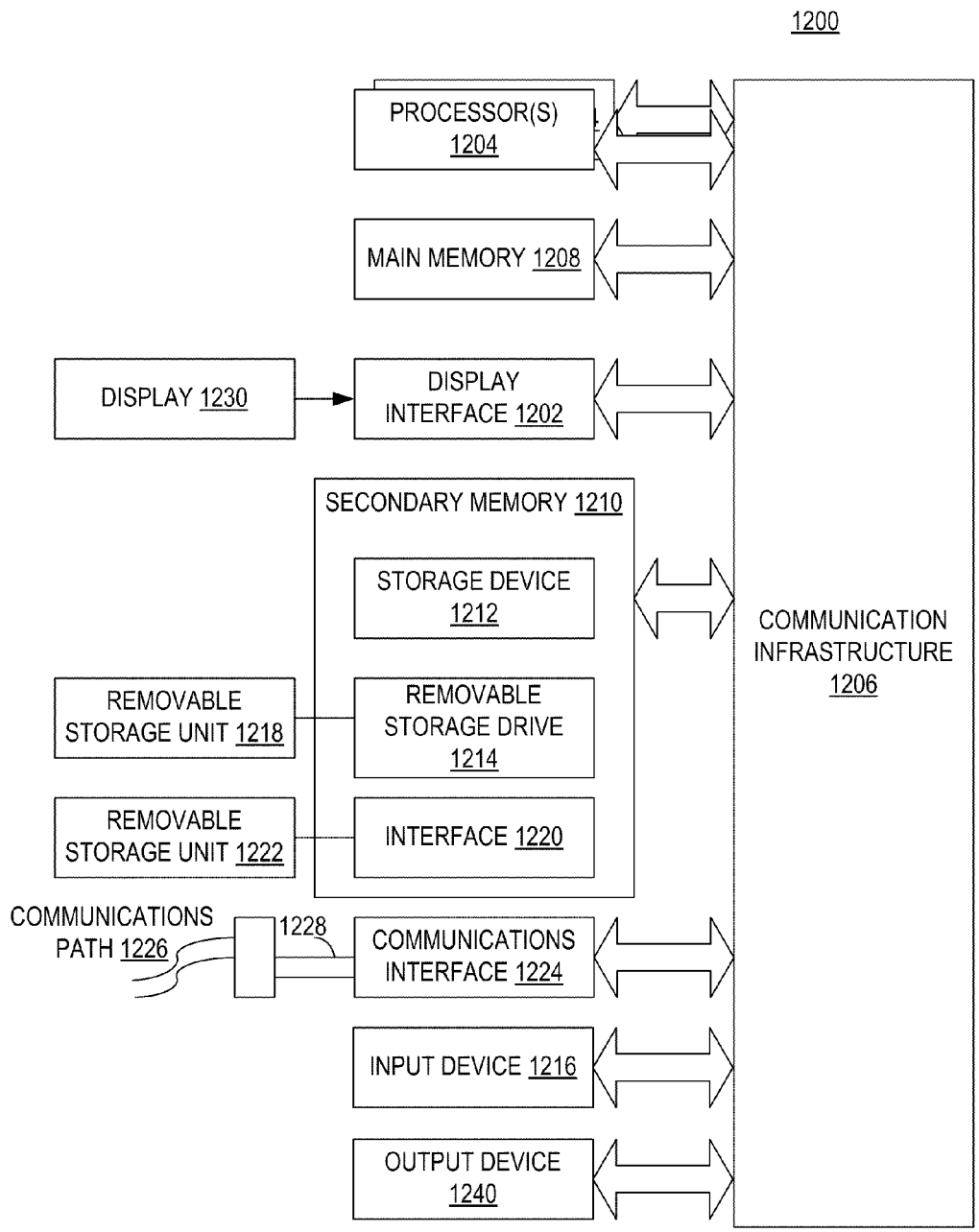
FIG. 12 illustrates an exemplary computer system that may be used in association with, in connection with, and/or in place of, but not limited to, any of the foregoing components and/or systems.

FIG. 12 illustrates a computer system 1200 that may be used in association with, in connection with, and/or in place of, but not limited to, any of the foregoing components and/or systems. The computer system may be a computer system of at least one of the floral arrangement creation engine system 102, the user computer 106, or the floral arranger system 108.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1200 is shown in FIG. 12, depicting an exemplary embodiment of a block diagram of an exemplary computer system useful for implementing the present invention. Specifically, FIG. 12 illustrates an example computer 1200, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/VISTA, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1200 is shown in FIG. 12. Other components of the invention, such as, e.g., (but not limited to) a computing device, a communications device, a telephone, a personal digital assistant (PDA), a smart phone, an iPhone™, an iPod™, a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 12.

The computer system 1200 may include one or more processors, such as, e.g., but not limited to, processor(s) 1204. The processor(s) 1204 may be connected to a communication infrastructure 1206 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1200 may include a display interface 1202 that may forward, e.g., but not limited to, graphics, text, and other data, etc., from the communication infrastructure 1206 (or from a frame buffer, etc., not shown) for display on the display unit 1230.

The computer system 1200 may also include, e.g., but may not be limited to, a main memory 1208, random access memory (RAM), and a secondary memory 1210, etc. The secondary memory 1210 may include, for example, (but may not be limited to) a hard disk drive 1212 and/or a removable storage drive 1214, representing a floppy diskette drive, a magnetic tape drive, an optical disk drive, a magneto-optical disk drive, a compact disk drive CD-ROM, a digital versatile disk (DVD), a write once read many (WORM) device, a flash memory device, etc. The removable storage drive 1214 may, e.g., but not limited to, read from and/or write to a removable storage unit 1218 in a well known manner. Removable storage unit 1218, also called a program storage device or a computer program product, may represent, e.g., but not limited to, a floppy disk, a magnetic tape, an optical disk, a magneto-optical disk, a compact disk, a flash memory device, etc. which may be read from and written to by removable storage drive 1214. As will be appreciated, the removable storage unit 1218 may include a computer usable storage medium having stored therein computer software and/or data.

In alternative exemplary embodiments, secondary memory 1210 may include other similar devices for allowing computer programs or other instructions to be loaded into computer system 1200. Such devices may include, for example, a removable storage unit 1222 and an interface 1220. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1222 and interfaces 1220, which may allow software and data to be transferred from the removable storage unit 1222 to computer system 1200.

Computer 1200 may also include an input device 1216 such as, e.g., (but not limited to) a mouse or other pointing device such as a digitizer, a keyboard or other data entry device (none of which are labeled), and/or a touchscreen integrated with display 1230, etc.

Computer 1200 may also include output devices 1240, such as, e.g., (but not limited to) display 1230, and display interface 1202. Computer 1200 may include input/output (I/O) devices such as, e.g., (but not limited to) communications interface 1224, cable 1228 and communications path 1226, etc. These devices may include, e.g., but not limited to, a network interface card, and modems (neither are labeled). Communications interface 1224 may allow software and data to be transferred between computer system 1200 and external devices. Examples of communications interface 1224 may include, e.g., but may not be limited to, a modem, a network interface (such as, e.g., an Ethernet card), a communications port, a Personal Computer Memory Card International Association (PCMCIA) slot and card, a transceiver, a global positioning system receiver, etc. Software and data transferred via communications interface 1224 may be in the form of signals 1228 which may be electronic, electromagnetic, optical or other signals capable of being received by communications interface 1224. These signals 1228 may be provided to communications interface 1224 via, e.g., but not limited to, a communications path 1226 (e.g., but not limited to, a channel). This channel 1226 may carry signals 1228, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1214, a hard disk installed in hard disk drive and/or other storage device 1212, etc. These computer program products may provide software to computer system 1200. The invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses and/or devices for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, an exemplary machine-readable storage medium may include, e.g., but not limited to, read only memory (ROM); random access memory (RAM); magnetic disk storage media; optical storage media; magneto-optical storage media; flash memory devices.

Computer programs (also called computer control logic), may include object oriented computer programs, and may be stored in main memory 1208 and/or the secondary memory 1210 and/or removable storage drive 1214, removable storage unit 1218, removable storage unit 1222, also called computer program products. Such computer programs, when executed, may enable the computer system 1200 to perform the features of the present invention as discussed herein. In particular, the computer programs, when executed, may enable the processor or processors 1204 to provide a method to control and/or manage operation of a positioning effect detection device according to an exemplary embodiment of the present invention. Accordingly, such computer programs may represent controllers of the computer system 1200.

In another exemplary embodiment, the invention may be directed to a computer program product comprising a computer readable medium having control logic (computer software) stored therein. The control logic, when executed by the processor 1204, may cause the processor 1204 to perform the functions of the invention as described herein. In another exemplary embodiment where the invention may be implemented using software, the software may be stored in a computer program product and loaded into computer system 1200 using, e.g., but not limited to, removable storage drive 1214, hard drive 1212 or communications interface 1224, etc. The control logic (software), when executed by the processor 1204, may cause the processor 1204 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

The exemplary embodiment of the present invention makes reference to, e.g., but not limited to, communications links, wired, and/or wireless networks. Wired networks may include any of a wide variety of well known means for coupling voice and data communications devices together. A brief discussion of various exemplary wireless network technologies that may be used to implement the embodiments of the present invention now are discussed. The examples are non-limiting. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB) networks, etc.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d, g, or n, such as, e.g., but not limited to, IEEE std. 802.11a, b, d, g and n (including, e.g., but not limited to IEEE 802.11g-2003, etc.), etc.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

According to an exemplary embodiment, exemplary methods set forth herein may be performed by an exemplary one or more computer processor(s) adapted to process program logic, which may be embodied on an exemplary computer accessible storage medium, which when such program logic is executed on the exemplary one or more processor(s) may perform such exemplary steps as set forth in the exemplary methods.

While various embodiments have been described above, it should be understood that they have been presented by way of example only, and not limitation. Thus, the breadth and scope of the described should not be limited by any of the above-described exemplary embodiments, but should instead be defined only in accordance with the following claims and their equivalents.

What is claimed is:

1. A method for providing a floral arrangement comprising:
providing, by using at least one software template processor, a plurality of flower choices to a user;
receiving a bouquet template choice comprising a bouquet template selected by the user from the plurality of bouquet templates, wherein the bouquet template choice identifies positions of flower types based on an image processing software algorithm that selects templates based upon a comparison of the flowers chosen and pre-defined images based on the image with the highest matching characteristics;
receiving, by using the at least one processor, from the user, at least two flower inputs from the plurality of flower choices, where each of said at least two flower inputs comprise a flower type, each said flower type comprising at least one of:
a line flower;
a focal flower; or
a filler flower;
determining a position for at least one of the at least two flower inputs based an image processing software algorithm that selects templates based upon a comparison of the flowers chosen and the predefined images based on the image with the highest matching characteristics;
generating, by using the at least one processor, a floral arrangement based on the flower types of the flower inputs based on an image processing software algorithm that selects templates based upon a comparison of the flowers chosen and the pre-defined images based on the image with the highest matching characteristics; and
providing, by using the at least one processor, the floral arrangement to the user.

2. The method of claim 1, further comprising:
providing the user the position of the flower type in the bouquet template choice.

3. The method of claim 1, wherein generating the floral arrangement comprises generating a floral suggestion for the user based on the flower type of the at least one of the flower input comprises at least one of:
calculating a position for the at least one flower input;
determining an orientation for the at least one flower input;
determining a color for the at least one flower input;
determining a size for the at least one flower input;
determining a type for the at least one flower input; or
determining an error suggestion.

4. The method of claim 3, wherein generating the floral suggestion is further based on at least one of the position or orientation of the at least one flower input.

5. The method of claim 4, wherein the position comprises at least one of a two dimensional position or a three dimensional position.

6. The method of claim 4, wherein generating the floral suggestion further comprises:
determining the flower type associated with a location in the floral arrangement; and
determining whether the flower type of the at least one flower input in the location corresponds to the flower type associated with the location.

7. The method of claim 1, further comprising:
receiving adjustment data to at least one of:
manipulate the at least one flower input;
rotate the at least one flower input on an axis; or
bend the at least one flower input forward, backward, or sideways.

8. The method of claim 1, further comprising:
providing a three dimensional representation of the floral arrangement.

9. The method of claim 1, further comprising:
receiving a dynamic color change request;
changing a color of all flower inputs of a flower type in the floral arrangement.

10. The method of claim 1, further comprising:
receiving at least one of a flower input or adjustment data from a second user for collaboratively generating the floral arrangement.

11. The method of claim 1, wherein said receiving from the user the flower input comprises receiving a drag-and-drop request of the flower choice.

12. The method of claim 1, further comprising:
receiving a room description input from the user, wherein the generating the floral arrangement is further based on the room description input.

13. The method of claim 1, further comprising: providing the user a real time competition with a second user in designing floral arrangements, the user designing the floral arrangement and the second user designing a second floral arrangement.

14. The method of claim 1, further comprising:
associating the floral arrangement with at least one of: a live video or non-live, of the implementation of the floral arrangement; and
providing the user information regarding the associated video.

15. The method of claim 1, wherein the floral arrangement comprises a non-floral item.

16. The method of claim 1, wherein the bouquet template comprises a theme bouquet template for a theme-based occasion.

17. The method of claim 1, wherein generating the floral arrangement comprises generating a floral suggestion for the user comprising a suggestion of a type of flower to add to the floral arrangement.

18. The merited of claim 1, wherein generating the floral arrangement comprises:
determining, by the at least one processor, that the floral arrangement fails to follow a design guideline; and
generating an instructive error message comprising a floral suggestion.

19. A machine-accessible non-transitory medium containing instructions that, when executed by at least one processor, cause the at least one processor to:
provide a plurality of flower choices to a user based on an image processing software algorithm that selects templates based upon a comparison of the flowers chosen and pre-defined images based on the image with the highest matching characteristics;
provide a plurality of bouquet templates to the user;
receive a bouquet template choice comprising a bouquet template selected by the user from the plurality of bouquet templates, wherein the bouquet template choice identifies positions of flower types based on an image processing software algorithm that selects templates based upon a comparison of the flowers chosen and the pre-defined images based on the image with the highest matching characteristics;
receive, from the user, at least two flower inputs from the plurality of flower choices, where each of said at least two flower inputs comprise a flower type, each said flower type comprising at least one of:
a line flower,
a focal flower; or
a filler flower;
determine a position based on an image processing software algorithm that selects templates based upon a comparison of the flowers chosen and the pre-defined images based on the image with the highest matching characteristics for at least one of the at least two flower inputs based on a position of the flower type of the at least one flower input in the received bouquet template choice;
generate a floral arrangement based on the flower types of the flower inputs; and provide the floral arrangement to the user.

20. An apparatus for providing a floral arrangement, comprising:
means for providing a plurality of flower choices to a user;
means for providing a plurality, of bouquet templates to the user;
means for receiving a bouquet template choice comprising a bouquet template selected by the user from the plurality of bouquet templates, wherein the bouquet template choice identifies positions of flower types based on an image processing software algorithm that selects templates based upon a comparison of the flowers chosen and pre-defined images based on the image with the highest matching characteristics;
means for receiving from the user at least two flower inputs from the plurality of flower choices, where each of said at least two flower inputs comprise a flower type, each said flower type comprising at least one of:
a line flower;
a focal flower; or
a filler flower;
means for determining based on an image processing software algorithm that identifies and computes different properties of flowers' its angles, orientations, density, and shape a position for at least one of the at least two flower inputs based on an image processing software algorithm that selects templates based upon a comparison of the flowers chosen and the pre-defined images based on the image with the highest matching characteristics;
means for generating a floral arrangement based on an image processing software algorithm that identifies selects templates based upon a comparison of the flowers chosen and the pre-defined images based on the image with the highest matching characteristics; and
means for providing the floral arrangement to the user.

* * * * *